United States Patent [19]
Paszyc et al.

[11] 3,972,814
[45] Aug. 3, 1976

[54] FLUIDIC OIL-WATER SEPARATOR

[75] Inventors: Aleksy J. Paszyc, Ventura; Dharam Pal, Woodland Hills; John B. Curry, Oxnard, all of Calif.

[73] Assignee: The United States of America as represented by the Secretary of the Navy, Washington, D.C.

[22] Filed: Feb. 12, 1975

[21] Appl. No.: 549,245

[52] U.S. Cl.................................. 210/84; 210/86; 210/512 R
[51] Int. Cl.²........................................ B01D 21/26
[58] Field of Search ............ 55/447, 457; 209/144, 209/211; 210/730 W, 83, 84, 86, 115, 242, 512, DIG. 21; 239/DIG. 7

[56] References Cited
UNITED STATES PATENTS

| | | | |
|---|---|---|---|
| 3,468,421 | 10/1969 | Hazel et al. ...................... | 210/115 X |
| 3,766,719 | 10/1973 | McAnally .......................... | 55/457 X |
| 3,789,988 | 2/1974 | Valibouse et al. ................... | 210/242 |
| 3,875,062 | 4/1975 | Rafael................................. | 210/242 |

FOREIGN PATENTS OR APPLICATIONS

| | | | |
|---|---|---|---|
| 1,302,558 | 7/1962 | France............................. | 55/447 |
| 930,205 | 7/1963 | United Kingdom................... | 210/84 |

OTHER PUBLICATIONS

Aeronautical Quarterly, vol. 11, 1960, pp. 201–231.

Primary Examiner—Charles N. Hart
Assistant Examiner—Robert G. Mukai
Attorney, Agent, or Firm—Richard S. Sciascia; Joseph M. St.Amand; Darrell E. Hollis

[57] ABSTRACT

An oil-water separating method and apparatus utilizing the Coanda Effect for separating oil from an oil-water mixture in a continuous manner. The device comprises a housing having an inlet port, an outlet port and a pair of offsetted walls. The oil-water mixture enters the housing parallel to the offsetted walls. A pair of concavely curved walls having an apex adjacent the inlet port splits the entering oil-water mixture into two sub-jets. Each sub-jet enters a bounded region where oil is separated from the water before the oil-water mixture exits the housing.

13 Claims, 7 Drawing Figures

Fig. 5.
Fig. 6.
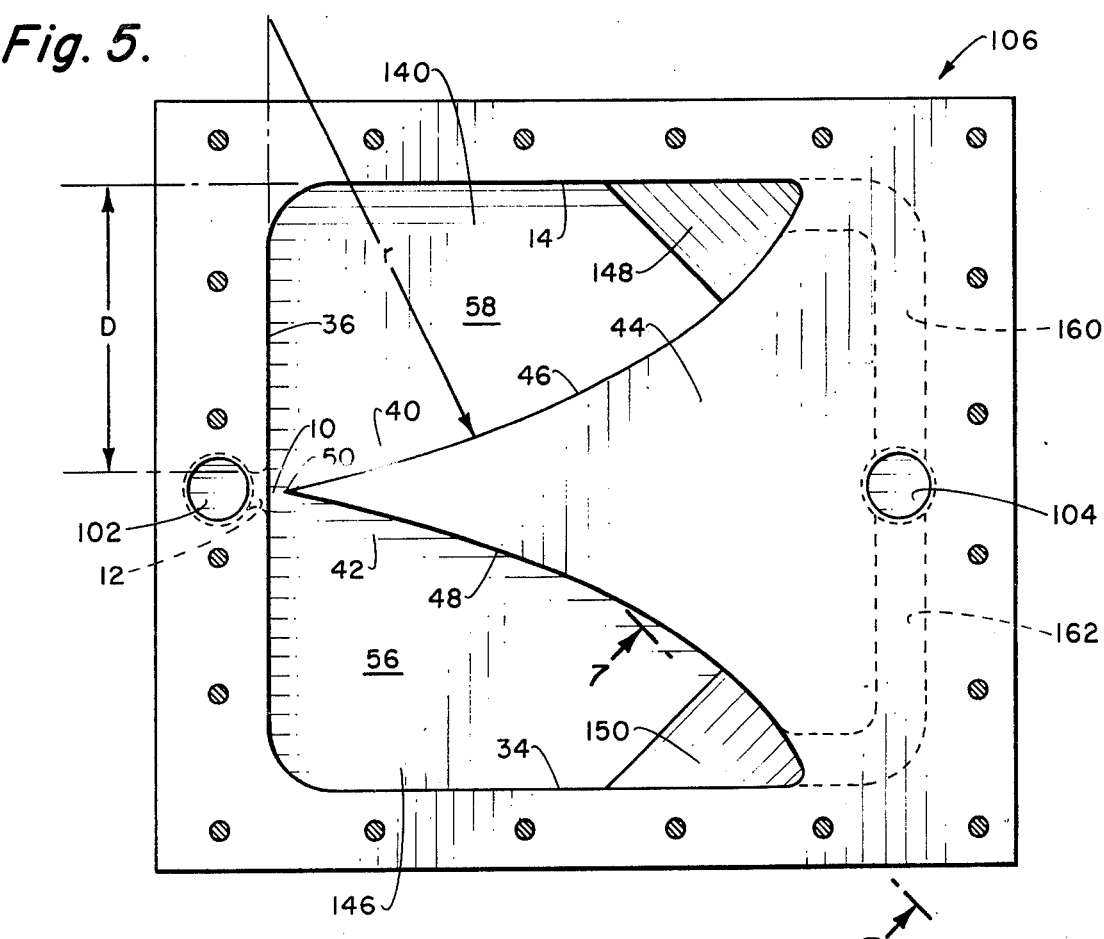
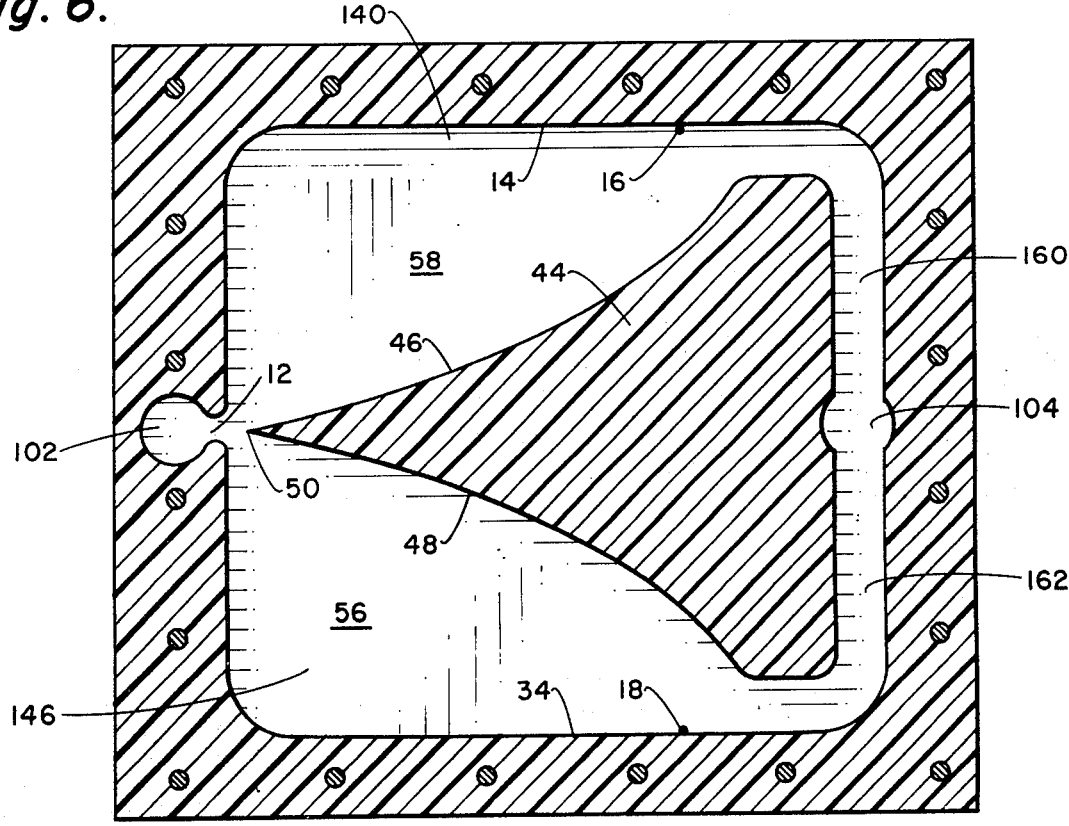

FLUIDIC OIL-WATER SEPARATOR

BACKGROUND OF THE INVENTION

1. Field of the Invention

The present invention relates generally to methods and apparatus for oil-water separation and more particularly relates to oil-water separators utilizing the Coanda Effect.

2. Description of the Prior Art.

Current methods and apparatus for the separation of oil from an oil-water mixture are gravitation, coalescence, ultra filtration as well as centrifugation. Centrifugation is an accepted method for separating water-oil dispersions or emulsions. Commercial equipment for this purpose is available for a wide range of applications. Despite their effectiveness, the power requirement, cost and maintenance of such systems are high.

The gravitation method of separating oil from oil-water mixtures relies upon difference in densities of the two fluids. Such systems are normally slow and bulky. Coalescence has been used quite extensively for removing finely dispersed water droplets from fuels. The basic mechanism behind this separation technique is the formation of larger oil drops on the coalescing material. The resulting larger drops can then be separated by gravity. This method, however, suffers from fouling of the coalescing element, thus requiring frequent maintenance. Finally, ultra filtration using a filtering process to separate water having smaller size particles from oil comprised of larger particles. This method, although quite effective, suffers from fouling of the filter element requiring frequent cleaning.

SUMMARY OF THE INVENTION

The present invention solves many of these problems by utilizing the concept of an oil-water separator based on the fluid dynamic phenomenon called the Coanda Effect, named after its discoverer, Henry Coanda. In the present invention, an oil-water mixture jet is split into sub-jets. Each sub-jet enters a bounded region where a separation bubble is formed. Oil is removed from the separation bubble. The oil-water mixture exits the bounded regions into a pair of downstream chambers where the oil coalesces before exiting. A pair of fins are provided to decrease turbulence in the bounded regions and to assist in the retention of oil in the bounded regions.

Accordingly, it is an object of the present invention to provide an oil water separation device utilizing the wall attachment effect.

Another object of the present invention is to provide an oil-water separation device which has relatively low power requirements.

Yet another object of the present invention is to provide an oil-water separating device which minimizes cleaning and maintenance.

Another object of the present invention is to reduce size and lower cost.

Other objects and a more complete appreciation of the present invention and its many attendant advantages will develop as the same becomes better understood by reference to the following detailed description when considered in connection with the accompanying drawings in which like reference numerals designate like parts throughout the figures thereof and wherein.

BRIEF DESCRIPTION OF THE DRAWINGS

FIG. 5 illustrates a view of the embodiment of FIG. 3 taken along line 5—5 of FIG. 4.

FIG. 6 illustrates a view of the embodiment of FIG. 3 taken along line 6—6 of FIG. 4.

DETAILED DESCRIPTION OF THE PREFERRED EMBODIMENT

Figure 1:
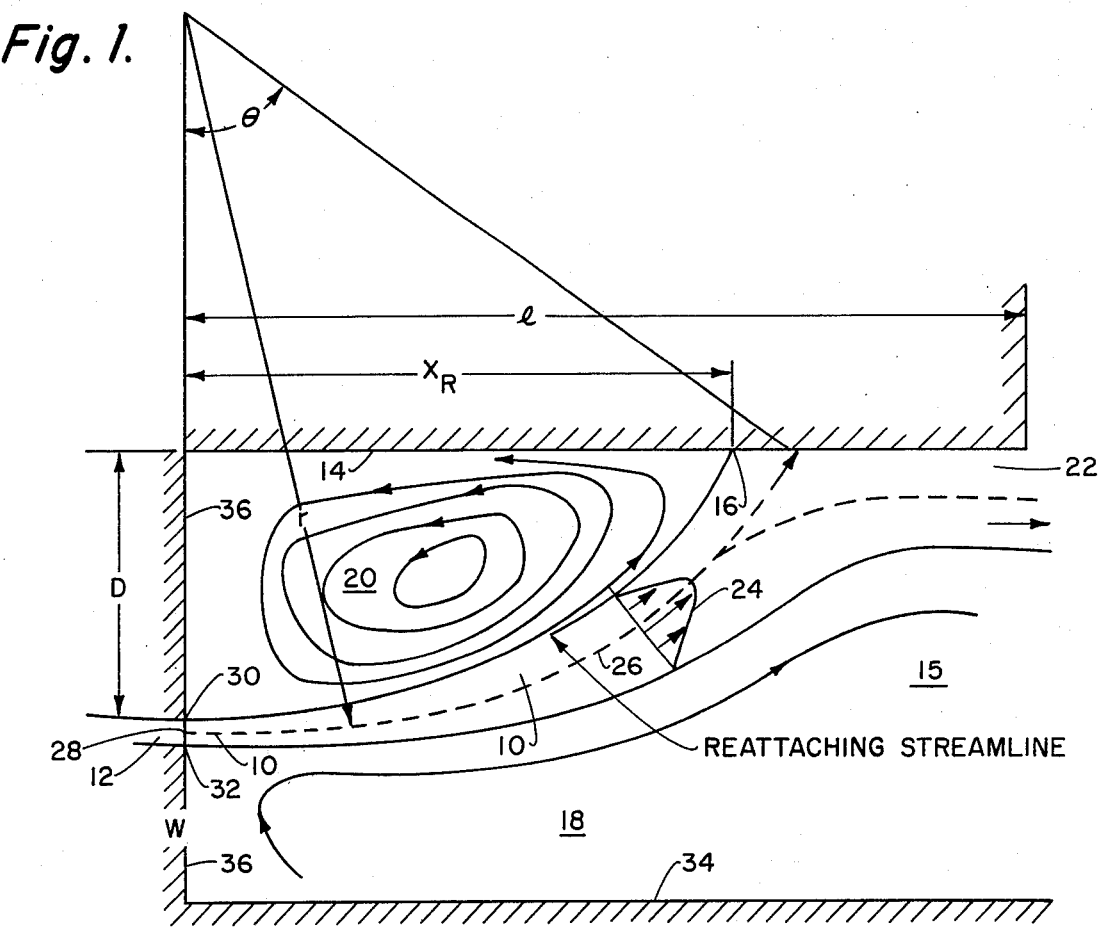
FIG. 1 illustrates the Coanda effect.

FIG. 1 illustrates the Coanda effect phenomenon. A two-dimensional oil-water mixture jet 10 issues into an unbounded region 18 from inlet nozzle 12 parallel to offset wall 14 a distance D away. Jet 10 during its expansion entrains fluid from the surroundings by turbulent action. The entrainment of fluid from the wall 14 side causes a pressure difference across jet 10 thus curving it toward wall 14 creating a separation bubble 20. In other words, the flow curvature creates a centrifugal force resulting in a negative pressure gradient and the formation of separation bubble 20. The oil being the lighter fluid, flows toward separation bubble 20 and can be removed therefrom at a controlled rate while water flows along wall 14 toward exit 22. If wall 14 is sufficiently long jet 10 strikes it and reattaches at reattachment point 16. Jet 10 divides on striking wall 14, sending a portion of the flow into separation bubble 20. A flow equilibrium is reached when the flow entrained by the wall 14 side of jet 10 is equal to that flowing into separation bubble 20 from jet 10 at reattachment point 16.

An experimental model showed that for a nozzle 12 having an offset D of about 4 inches, the length of attachment wall 14 was determined to be approximately 12 inches. For these values, the attachment point 16 occurred at a distance $X_R$ of approximately 7 inches for a water flow of 1½ gallons per minute through a nozzle of approximately ⅜ of an inch. For much greater flow rate, the relative dimensions of the Coanda effect separator would, of course, have to be increased. However, for mixture flow rates through the separator of 20–100 gallons per minute, the relative size of the Coanda effect separator was found to be substantially less than parallel plate separators handling the same volume.

A theoretical discussion as well as a mathematical derivation of all the pertinent parameters associated with FIG. 1 and related discussion can be obtained from an article by C. Bourque and B. G. Newman entitled "Reattachment of a Two-Dimensional Incompressible Jet to an Adjacent Flat Plate," found in the Aeronautical Quarterly, Volume XI, August 1960, pages 201–230.

It can be seen by considering the Coanda flow illustrated in FIG. 1 that the jet velocity profile 24 of jet 10 is a maximum at center-line 26 and drops to a very low value at the theoretical half-width points located on either side of center-line 26. Consequently, the centrifugal acceleration, which is proportional to the square of the velocity of jet 10 and acts normal to the axis of jet 10 in the outward direction, is a maximum at jet center-line 24 also. The centrifugal acceleration drops sharply to a low value at the half width points on either side of jet center line 26. When an oil particle is released from nozzle 12, it experiences an inward force due to the centrifugal force field and the buoyance forces. Thus, the particle undergoes radial displacement towards separation bubble 20 during its passage through the jet flow. The magnitude of the radial displacement, however, depends upon the point at nozzle 12 where the particle emanates. A particle originating between points 28 and 30, will experience a greater inward force than the one issuing between point 28 and 32. Therefore, a particle released between points 28 and 30, during its passage will suffer a greater inward displacement than one originating between points 28 and 32.

While the probable trajectories of an oil particle emanating from nozzle 12 between points 28 and 30 or points 28 and 32 depend to a great extent on particle size and nozzle efflux, the chances of an oil particle emanating between points 28 and 30 entering separation bubbles 20 are much higher than those of an oil particle emanating between points 28 and 32. In fact, an oil particle emanating between points 28 and 32 may never cross centerline 26.

Due to practical consideration, a second wall 34 as well as a wall 36 must be included in FIG. 1. Wall 36 contains nozzle 12 and serves as a barrier for retaining the oil-water mixture in unbounded region 18. Wall 34 must be located a distance greater than D from point 32 or jet 10 will attach itself to wall 34 instead of wall 14. Wall 34 creates a large but weak eddy 15 adjacent jet 10 which traps some oil from jet 10. The trapped oil is fed back into jet 10 in the vicinity of nozzle 12 by the entrained flow of jet 10.

The radius of curvature ($r$) of centerline 26, the distance $X_R$ of reattachment point 16 from wall 36, and the length ($l$) of wall 14 are illustrated in FIG. 1. Of course, the length ($l$) of wall 14 is greater than the distance ($X_R$).

Figure 2:
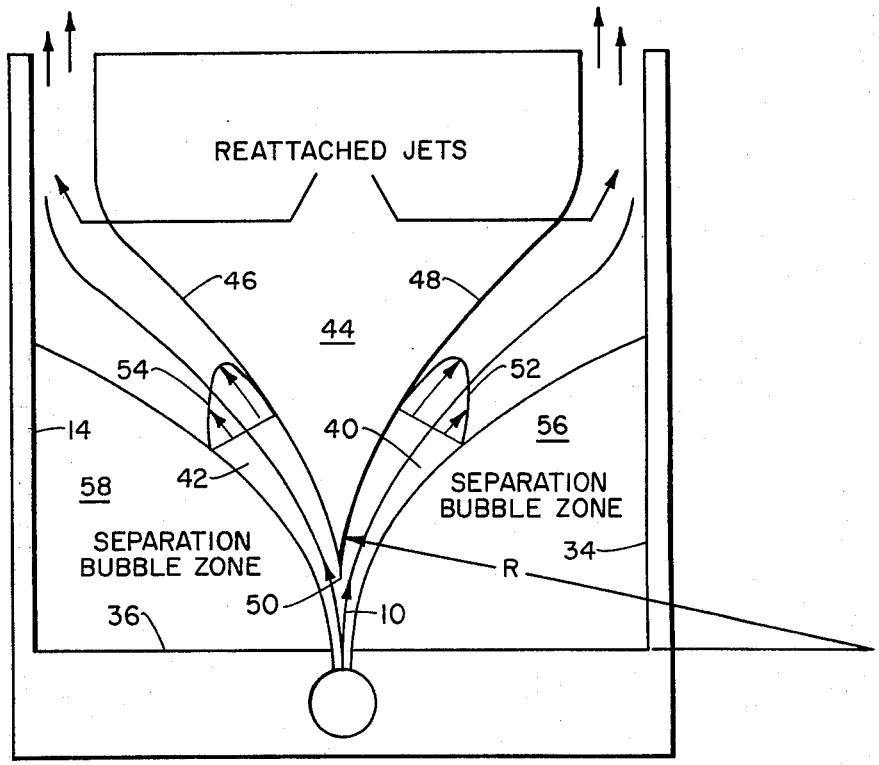
FIG. 2 illustrates the splitting of the oil-water mixture into two sub-jets and the attendant advantages derivable therefrom.

Turning to FIG. 2, jet 10 is split into sub-jet 40 and 42 by splitter 44. Splitter 44 comprises a pair of concavely curved walls 46 and 48 forming an apex 50. Apex 50 is located adjacent the axis of nozzle 12 such that jet 10 is subdivided into sub-jets 40 and 42. The radius ($r$) of curved walls 46 and 48 is equal to the radius of curvature ($r$) of the centerline of jet 10 of FIG. 1.

As is illustrated by velocity profiles 52 and 54 of sub-jet 40 and 42, the velocities of sub-jets 40 and 42 are a maximum near curved walls 46 and 48 and monotonically decrease to zero at the centers of separation bubbles 56 and 58. This configuration induces monotonically decreasing forces on the oil particles in sub-jets 40 and 42 in the direction of separation bubbles 56 and 58 with a force maximum adjacent curved walls 46 and 48. The actual position of the force maximum is at the faces of curved walls 46 and 48 where wall boundary layers are formed. The wall boundary layers vary in thickness from five to ten percent of the width of sub-jet 40 or 42. Thus, by designing the radius of curvature (R) of curved walls 46 and 48 to equal the radius of curvature of centerline 26 of FIG. 1 the amount of oil forced into separation bubbles 56 and 58 in greater than the amount of oil forced into separation bubble 20 of FIG. 1. Of course in both FIGS. 1 and 2 wall 34 and 14 are a distance D from nozzle 10. Also, the size of nozzle 12 and the velocity of jet 10 as it exits nozzle 10 are substantially identical in both FIGS. 1 and 2.

Figure 3:
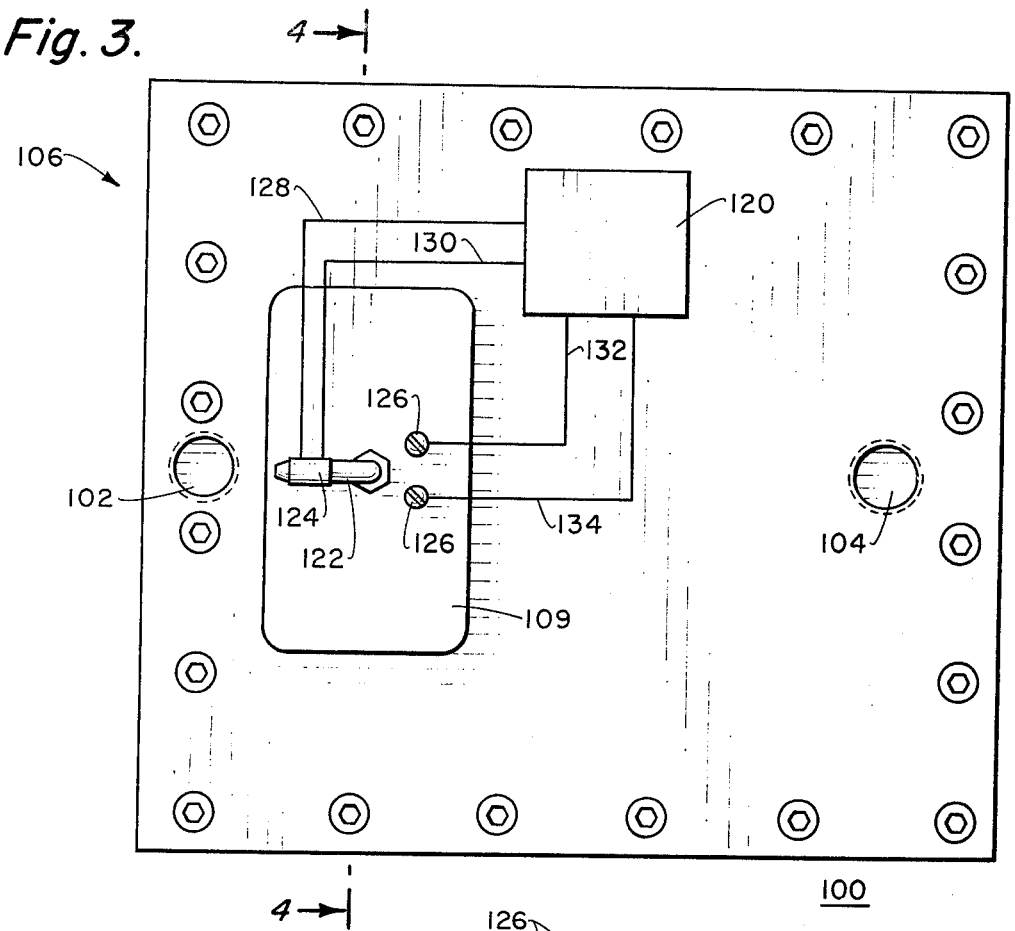
FIG. 3 illustrates a top-view of a specific embodiment of the present invention.

Now turning to FIG. 3, a specific embodiment of the present invention is illustrated utilizing the principles discussed, supra. Oil-water separator 100 comprises an inlet port 102, an outlet port 104, and housing 106. Oil collecting chamber 108 is located on the top side of housing 106 as is detection circuit 120. Oil contained in oil collection chamber 108 is forced out through tube 122. Solenoid valve 124 is located in tube 122. Electrodes 126 extend downward into oil collecting chamber 108. Electrodes 126 sense the oil-water interface inside chamber 108. When oil or air surrounds electrodes 126, an open circuit forms between them. This actuates detection circuit 120 to open solenoid valve 124 via lines 128 and 130. When water surrounds electrodes 108 a short circuit forms between them. This actuates detection circuit 120 to close solenoid valve 124. Electrodes 126 are connected to detection circuit 120 via lines 132 and 134.

Now turning to FIG. 5 and FIG. 6 splitter 44 is illustrated. Splitter 44 comprises a pair of concavely curved walls 46 and 48 which form an apex 50 adjacent the axis of nozzle 12 such that jet 10 is subdivided into sub-jets 40 and 42. It is noted that jet 10 and sub-jets 40 and 42 are not shown in FIG. 5 but are identical to those shown in FIG. 2. The radius ($r$) of curved walls 46 and 48 is equal to the radius of curvature ($r$) of the centerline of jet 10 of FIG. 1. The discussion with respect to the velocity profiles 52 and 54 of FIG. 1 also applies to the specific embodiment of FIGS. 5 and 6.

Offset wall 14, curved wall 46, bottom plate 142, top plate 144, and wall 36 form a bounded region 140. Offset wall 34, curved wall 48, bottom plate 142, top plate 144, and wall 36 form a bounded region 146. Separation bubbles 56 and 58 are located in bounded regions 146 and 140 respectively. It is noted that bottom plate 142 and top plate 144 are parallel.

Figure 7:
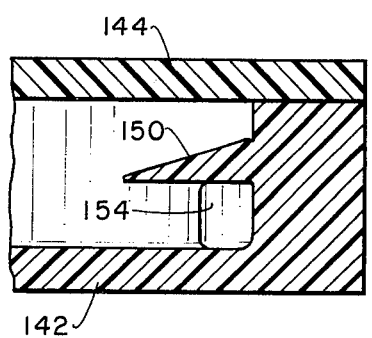
FIG. 7 illustrates a view of the embodiment of FIG. 3 taken along line 7—7 of FIG. 5.

A pair of fins 148 and 150 are located in bounded regions 140 and 146 respectively. A cross-sectional view of fin 150 is illustrated in FIG. 7. Fins 148 and 150 are located above orifices 152 and 154 (FIG. 4) respectively in the area where sub-jets 40 and 42 impact offsetted walls 34 and 14 respectively. It is noted that points of reattachment 16 and 18 are located adjacent fins 148 and 150 respectively. Fins 148 and 150 improve the performance of oil-water separator 100 by preventing a portion of the oil in bounded regions 140 and 146 respectively from exiting through orifices 152 and 154 respectively. In addition, fins 148 and 150 assist the formation of separation bubbles 56 and 58 in that fins 148 and 150 reduce the turbulence in bounded regions 140 and 146.

Orifices 152 and 154 separate bounded regions 140 and 146 from downstream chambers 160 and 162. Downstream chambers 160 and 162 connect to outlet port 104. The cross-sectional area of downstream chambers 160 and 162 is greater than that of the cross-section area of nozzle 12 as well as greater than the cross-sectional area of outlet port 104. This increase in cross-sectional area allows the oil in the oil-water mixture to coalesce before it flows out of housing 106 through outlet port 104. In addition the cross-sectional area of outlet port 104 is less than the cross-sectional area of nozzle 12. This decrease in cross-sectional areas allows the oil-water mixture to remain in bounded regions 140 and 146 for a longer time period thus allowing more oil to separate from the water.

Figure 4:
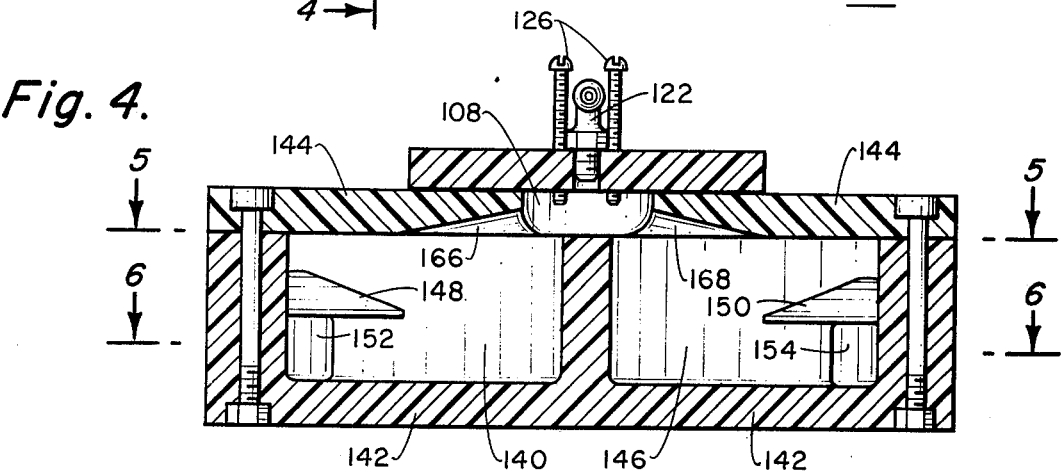
FIG. 4 illustrates a cross-sectional view of FIG. 3.

As illustrated in FIG. 4, oil collection chamber 108 communicates with bounded regions 140 and 146 via passages 166 and 168 respectively. Passages 166 and 168 extend over separation bubbles 56 and 58. The oil in separation bubbles 56 and 58, since heavier than water, rises into chamber 108 where it is forced out through tube 122 to an oil collection receptacle (not shown).

The design parameters for the specific embodiment illustrated in FIG. 3 and FIG. 7 are as follows:

| | |
|---|---|
| Nozzle - half width | ¼ inch |
| Wall offset (D) | 4 inches |
| Radius of the Splitter Walls (r) | 8 inches |
| Flow passage depth | 1½ inches |
| Hydraulic diameter of the nozzle | ¾ inch |
| output port width | ½ inch |
| Designed nozzle efflux | 3.5 gpm |
| Nozzle parameters at design conditions: | |
|    Average Velocity | 1.496 ft/sec |
|    Reynolds number | 7790 |
|    Jet momentum | 0.0226 lb |

In general, the more viscous the oil the more effective the separation of oil from the oil-water mixture. Also, the slower the flow rate of the oil-water mixture, the more effective the separation of oil from the oil-water mixture.

Of course, oil-water separator 100 may be placed in series with other oil-water separators to further increase oil separation effectiveness.

It is noted that oil-water separator 100 may be operated without the use of power to force the oil-water mixture through separator 100. The force of gravity alone will provide satisfactory operating results.

It will be appreciated by those having ordinary skill in the art that a complete oil-water separator as shown in FIGS. 3-7 includes such suitable and necessary fabricating materials and techniques as are commonly employed in the art.

Obviously, numerous modifications and variations of the present invention are possible in light of the above techniques. It is therefore to be understood that within the scope of the appended claims the invention may be practiced otherwise than as specifically described herein.

I claim:

1. An apparatus for separating oil from an oil-water mixture utilizing the Coanda effect comprising:
   a. an enclosed cavity having an inlet port, an outlet port, and first and second offsetted walls disposed between flat plates, said inlet port including a nozzle for directing said oil-water mixture parallel to and spaced from each said offsetted walls;
   b. means located inside said enclosed cavity for splitting said oil-water mixture into a first and a second jet having respective first and second velocity profiles as said oil-water mixture enters said enclosed cavity via said inlet port nozzle;
   c. said splitting means, said first and second offsetted walls, and said flat plates forming respective first and second bounded regions within said enclosed cavity into which said first and second oil-water mixture jets are respectively directed from said inlet port by said splitting means, said apparatus operating essentially in two dimensions to form first and second separation bubbles in respective said first and second bounded regions by attachment of respective said first and second jets to respective said first and second offsetted walls due to said Coanda effect, said first and second velocity profiles being a maximum adjacent said splitting means such that more than one-half the oil in each said first and second jet experiences a force vector in the direction of respective said first and second separation bubbles;
   d. means attached to said enclosed cavity and communicating with said first and second bounded regions for extracting and collecting oil from said first and second separation bubbles.

2. The apparatus of claim 1 wherein said splitting means and said enclosed cavity also form a first and second downstream chamber respectively located between said first and second bounded regions and said outlet port, said first and second downstream chamber respectively communicating with said first and second bounded regions via a first and second orifice, each said downstream chamber having substantially identical cross-sectional areas throughout the lengths thereof.

3. The apparatus of claim 2 wherein said splitting means comprises a first and second concavely curved wall forming an apex adjacent said inlet port nozzle.

4. The apparatus of claim 3 wherein the radius of curvature of said curved walls is equal to the radius of curvature of a jet center-line in a Coanda flow.

5. The apparatus of claim 3 wherein said first and second concavely curved walls respectively extend from said apex to said first and second orifices, said first and second orifices being respectively located between said offsetted walls and said first and second curved walls such that said first and second jets respectively follow said first and second curved walls and respectively impact said offset walls at points respectively adjacent said first and second orifices, said impact points being points of reattachment in a Coanda flow.

6. The apparatus of claim 5 further comprising a first and second fin respectively located in said first and second bounded regions where said first and second jets respectively impact said offsetted walls, said first and second fins being respectively located above said first and second orifices.

7. The apparatus of claim 2 further comprising a first and second fin respectively located in said first and second bounded regions adjacent said first and second orifice, said first and second fins reducing the turbulence in said first and second bounded regions as well as increasing the time the oil remains in said first and second bounded region.

8. The apparatus of claim 2 wherein the cross-sectional area of said first and second downstream chambers is greater than the cross-sectional area of said inlet port and greater than the cross-sectional area of said outlet port causing an increased coalescence of the oil in the oil-water mixture prior to entry into said outlet port.

9. The apparatus of claim 1 wherein said extracting and collecting means comprises an oil-collecting chamber communicating with said first and second separation bubbles respectively via a first and second curved passage.

10. The apparatus of claim 9 wherein said extracting and collecting means further comprises:
   a. a tube;
   b. a solenoid valve located in said tube;
   c. a detection circuit connected between said oil-collecting chamber and said solenoid valve for detecting the presence of oil in said oil-collecting chamber, said circuit closing said solenoid valve when no oil is present in said oil-collecting chamber and opening said solenoid valve when oil is present in said oil-collecting chamber.

11. The apparatus of claim 1 wherein the cross-sectional area of said inlet port is greater than the cross-sectional area of said outlet port such that said outlet port partially restricts the flow of the oil-water mixture through said apparatus, thereby increasing the time for the oil to separate in said first and second bounded regions.

12. A method of separating oil from an oil-water mixture utilizing the Coanda effect comprising:
  a. splitting a first oil-water mixture jet into a second and third jet;
  b. directing said second the third jets into a first and second bounded region respectively, said first and second bounded regions creating a first and second Coanda separation bubble respectively therein;
  c. directing the oil-water mixture after exit from said first and second bounded region respectively into a first and second downstream chamber so that the oil in the oil-water mixture may coalesce;
  d. restricting the flow of the oil-water mixture after exit from said first and second downstream chambers such that the time for the oil to separate in said first and second bounded regions is increased; and
  e. extracting and collecting the separated oil from said first and second Coanda separation bubble.

13. The method of claim 12 comprising, after the step of directing, the further step of providing a first and second exit for said oil-water mixture from said first and second bounded regions;
shearing the oil from the top of the water adjacent said first and second exits such that turbulence is reduced in said first and second bounded regions and the time the oil remains in said first and second bounded regions is increased.

* * * * *